H. H. SWAN.
TIRE.
APPLICATION FILED JUNE 4, 1920.

1,393,849.

Patented Oct. 18, 1921.

Inventor:
Herbert H. Swan
By Cyrus W. Rice
his Attorney.

UNITED STATES PATENT OFFICE.

HERBERT H. SWAN, OF GRAND RAPIDS, MICHIGAN.

TIRE.

1,393,849. Specification of Letters Patent. Patented Oct. 18, 1921.

Application filed June 4, 1920. Serial No. 386,488.

*To all whom it may concern:*

Be it known that I, HERBERT H. SWAN, a citizen of the United States, residing at Grand Rapids, in the county of Kent and State of Michigan, have invented new and useful Improvements in Tires, of which the following is a specification.

The present invention relates to tires for vehicle wheels; and its object is to provide such a tire having means for enabling it to climb out of ruts and depressions in the road.

This object is attained by, and the invention finds preferable embodiment in, the structure hereinafter particularly described and illustrated by the accompanying drawings, in which:—

In the embodiment of the invention chosen for illustration by the drawings and for detailed description in the body of this specification, a tire for vehicle wheels, such as automobiles, is shown. In the form illustrated the tire is of the type known as "pneumatic," but my invention is equally applicable to "solid" tires, or in fact to any tires for vehicle wheels.

The tire shown has stepped projections 1, which projections extend longitudinally in the circumferential direction of the tire and extend laterally in the direction of the tire's axis of rotation; each projection extending thus laterally farther from the central plane 2 of the tire which plane is perpendicular to its said axis than the projection nearer the tire's periphery extends from said plane. It will thus be seen that the projections form (in the tire's cross section) steps which, in succession toward the axle of the wheel on which the tire is mounted, extend farther from said plane and nearer to said axle. The steps are spirally disposed about the tire's rotative axis in one continuous rib 5. It is manifest however that the spirally disposed rib may be broken into sections as may be desired instead of assuming the continuous formation shown.

Figure 1:
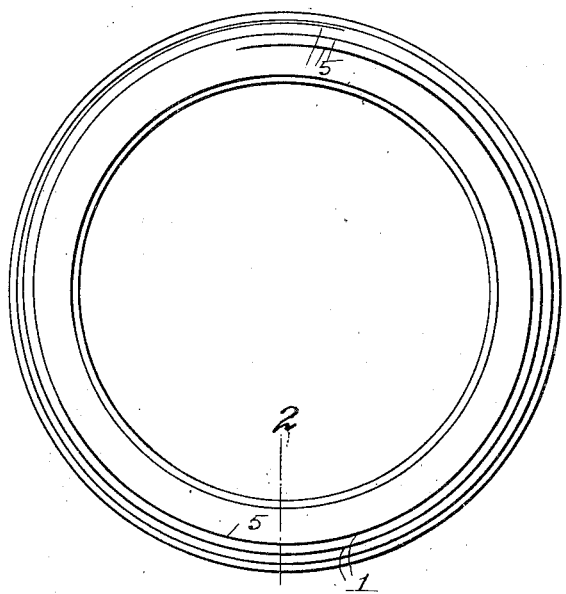
Figure 1 is a side view of a tire for a vehicle wheel.
Figure 2:
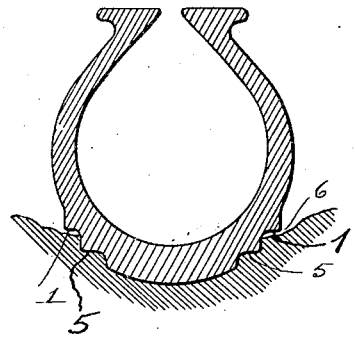
Fig. 2 is a sectional view of the same taken on line 2—2 of Fig. 1.

The spirally disposed rib 5 (forming a plurality of projections as particularly seen in the cross sectional view, Fig. 2) will cause the tire to gradually climb out of the rut 6, the wheel rolling in the direction which causes the diameter of its tread on the bottom of the spiral rib 5 to gradually increase.

The invention being intended to be pointed out in the claim is not to be limited to or by details of construction of the particular embodiment thereof illustrated by the drawings or hereinbefore described.

I claim:

A tire having on each side of its central plane which is perpendicular to its axis stepped projections spirally disposed about the tire's rotative axis and extending longitudinally in the tire's circumferential direction and laterally in the direction of its rotative axis, each projection extending thus laterally farther from the central plane of the tire which is perpendicular to said axis than the projection nearer the tire's periphery, and the stepped projections on one side of said vertical plane winding in a right-hand direction and the stepped projections on the other side of said central plane winding in a left-hand direction.

In testimony whereof I have hereunto set my hand at Grand Rapids, Michigan, this 29th day of May, 1920.

HERBERT H. SWAN.